May 20, 1958 G. P. MATHEWS 2,835,057
TAG FOR TEA BAGS AND THE LIKE
Filed April 20, 1956
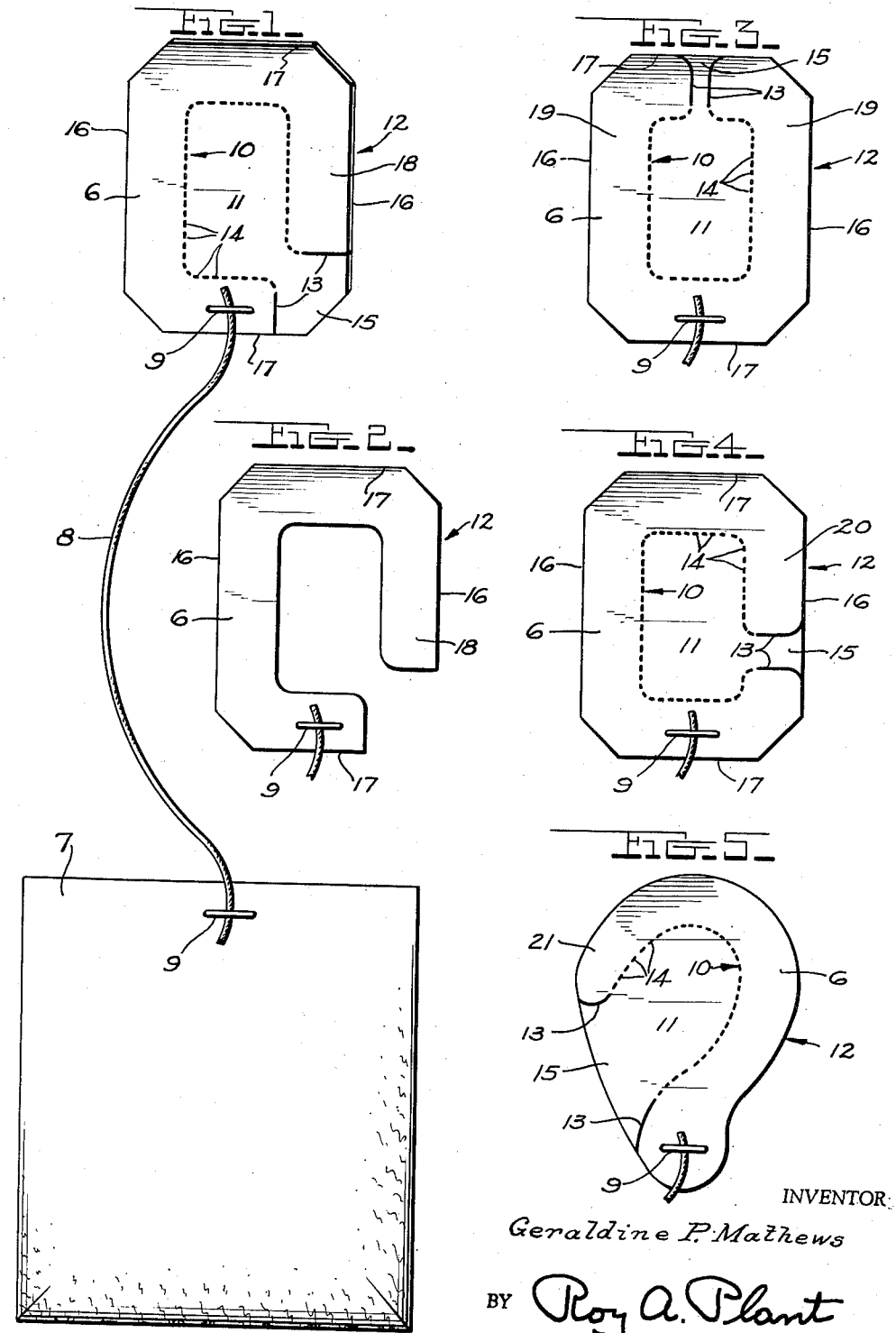
INVENTOR:
Geraldine P. Mathews
BY Roy A. Plant
ATTORNEY

United States Patent Office 2,835,057
Patented May 20, 1958

2,835,057

TAG FOR TEA BAGS AND THE LIKE

Geraldine P. Mathews, Battle Creek, Mich.

Application April 20, 1956, Serial No. 579,466

7 Claims. (Cl. 40—2)

The present invention relates broadly to anchoring means, and in its specific phases to a special form of tea bag tag having a tear-out portion making possible its conversion to hook-like form for engaging the rim or other suitable portion of a cup, tea pot, or the like.

Tea bags at the present time are universally made with a string having a small bag of tea attached to one end of same and a tag at the other end. These tags serve as a bag handling aid as well as to carry the name of the tea and some advertising matter. In actual use these tags frequently get into the tea cup or tea pot where they are not wanted. An effort to avoid this difficulty has been made by way of eliminating the tag entirely and providing a bag which will clip onto a spoon which is used to insert and remove the bag from a tea cup or tea pot, but apparently this has never gone into commercial use. Even a fish-hook wire has been fastened to the tag for anchoring to the spout of a tea pot, but the obvious dangerousness of such wire hooks has prevented them from being commercially feasible. It was a recognition of this special problem and the complete lack of any commercially feasible solution to same which led to the conception and development of the present invention.

Accordingly among the objects of the present invention is the provision of a new and improved tag, for tea bags or the like, which may be quickly connected with the rim or other suitable portion of a cup or pot to overcome the above mentioned difficulty.

It is desirable to have the tag of hook-like form but if manufactured in such form it would possess relatively small areas for advertising and/or identification of the tea. The invention, therefore, aims to provide a tag which normally possesses a more or less conventional size and shape but may be quickly and easily converted into hook-like form at the time of use.

In carrying out the above ends, another object is to provide the tag with tear-line, at least a portion of which is weakened, and which defines a tear-out portion, the ends of said tear-line extending to the perimeter of the tag and said line extending in such directions that tearing out of said tear-out portion will convert the tag into hook-like form.

Another object is to form the end portions of the tear-line by two elongated slits extending through the tag, the remainder of said tear-line being formed by suitable perforations also extending through the tag, it being therefore an easy matter to start removal of the tear-out portion and to continue the tearing out operation.

Still another object is to have the aforesaid slits diverge to the perimeter of the tag to give more area to the part of the tear-out portion which must be engaged by thumb and finger or the nails thereof to start the tear-out operation.

A further object is to provide an extremely simple, efficient, and inexpensive yet greatly improved tag.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In the annexed drawing:

Figure 1 is a perspective view showing one of the improved tags conventionally connected by the customary string to a tea bag.

Figure 2 is a side elevation showing the tag of Figure 1 converted into hook-like form by removal of its tear-out portion.

Figures 3, 4 and 5 are side elevations showing other forms of tags embodying the present invention.

In all forms of the invention, so far as tea bags are concerned, it is intended that the tag 6 be connected to a tea bag 7 by means of the usual string 8. Staples 9 have been shown connecting the ends of the string 8 to the tag and bag but this could of course be done in any other suitable manner. The tag 6 is provided with a weekend tear-line 10 which defines a tear-out portion 11. The ends of this tear-out line 10 extend to the perimeter 12 of the tag 6 and said line extends in such directions that upon tearing out of the tear-out portion 11, the tag will possess a hook-like form to engage the rim or other suitable portion of a cup or pot.

The ends of the tear-line 10 are shown as formed by elongated slits 13 extending through the tag, and closely spaced perforations 14 are shown as forming the remainder of said tear-line, said perforations also extending through the tag. Thus, the tear-out portion 11 may be easily started from its normally position and the tearing out operation then easily continued.

The slits 13 may diverge throughout their lengths to the tag perimeter, Figures 1 and 5, or may only have their outer end portions diverging to said perimeter, Figures 3 and 4. In either case greater width is imparted to the exposed end 15 of the tear-out portion 11, thus facilitating gripping of said end 15 with a thumb and finger, or with the nails thereof, to facilitate removal of said tear-out portion 11.

The tags of Figures 1 to 4, inclusive, are of generally rectangular form with their corners removed for more attractive appearance. Each of these tags therefore has two longitudinal edge portions 16 and two transverse edge portions 17.

In Figure 1, the slits 13 open respectively through one longitudinal edge portion 16 and through an adjacent transverse edge portion 17, and the tear-line 10 has its perforation-formed reaches substantially parallel with the four edge portions 16 and 17.

In Figure 3, the slits 13 open through one of the transverse edge portions 17 and the perforation-formed reaches of the tear-line 10 are again substantially parallel with the edge portions 16 and 17 of the tag.

In Figure 4, the slits 13 open through one longitudinal edge portion 16 of the tag. Here, again, the perforation-formed reaches of the tear-line 10 are substantially parallel with the edge portions 16 and 17 of the tag.

In Figure 5, the tag and the tear-line 10 are of substantially ovate form and the slits 13 open through one longitudinal edge of the tag, in widely spaced relation.

In Figure 1, the described construction provides the tag with one elongated hook-bill-forming portion 18. Two elongated parallel bill-forming portions 19 are provided in Figure 3. An elongated bill-forming portion 20 is provided in Figure 4, and Figure 5 provides a long, curved bill-forming portion 21. Any of the hook bills formed by the portions 18 to 21 upon removal of the tear-out portion 11, may be readily engaged with a suitable portion of a cup or pot to connect the tag therewith, thus preventing falling of the tag into the cup or pot.

It will be seen from the foregoing that novel and advantageous provision has been made for attaining the desired ends, efficiently and attractively. However, attention is invited to the possibility of making variations within the spirit and scope of the invention as set forth, with particular note that while the invention has been described in terms of its primary use as a tea bag tag, it can well be used in any other connection where anchoring of a tag type member is desired.

Other modes of applying the principle of my invention may be employed instead of those explained, change being made as regards the tag herein disclosed, provided the means stated by any of the following claims or the equivalent of such stated means be employed.

I therefore particularly point out and distinctly claim as my invention:

1. A tag for attachment to a string, such as the usual tea bag-immersing string, said tag having a line defining a tear-out portion, at least a portion of said line being weak and tearable with the ends of said tear-line extending to the perimeter of the tag, said line extending in such directions that the tag will be converted to hook-like form by removal of said tear-out portion, the hook-like tag being then adapted to engage the rim or other suitable portion of a cup, pot, or other article to connect the tag thereto.

2. A structure as specified in claim 1; the ends of said tear-line being in the form of elongated slits extending through the tag, the remainder of said tear-line being in the form of suitable perforations also extending through the tag.

3. A structure as specified in claim 1; the ends of said tear-line being in the form of elongated slits extending through the tag and diverging to the perimeter of the same, the remainder of said tear-line being in the form of suitable perforations also extending through the tag.

4. A structure as specified in claim 1; said tag having two longitudinal edge portions and two transverse edge portions, one end of said tear-line extending to one of said longitudinal edge portions, the other end of said tear-line extending to the adjacent transverse edge portion.

5. A structure as specified in claim 1; said tag having two longitudinal edge portions and two transverse edge portions, both ends of said line extending to one of said transverse edge portions.

6. A structure as specified in claim 1; said tag having two longitudinal edge portions and two transverse edge portions, both ends of said line extending to one of said longitudinal edge portions.

7. A tea bag tag for attachment to the usual bag-immersing string; said tag having a weakened tear-line defining a tear-out portion, the ends of said tear-line diverging and extending to the perimeter of the tag, said line extending in such directions that the tag will be converted to hook-like form by removal of said tear-out portion, the hook-like tag being then adapted to engage the rim or other suitable portion of a cup or pot to connect the tag thereto.

References Cited in the file of this patent

UNITED STATES PATENTS

| | | |
|---|---|---|
| 1,362,054 | Stockman | Dec. 14, 1920 |
| 1,430,641 | Ginn | Oct. 3, 1922 |
| 1,672,518 | Ensko | June 5, 1928 |
| 1,723,702 | Mitchell | Aug. 6, 1929 |
| 1,872,260 | Elzey | Aug. 16, 1932 |